(No Model.)

E. HILL.
CUT-OFF VALVE FOR STEAM ENGINES.

No. 457,558. Patented Aug. 11, 1891.

Witnesses
J. H. Shumway
L. D. Kelsey

Ebenezer Hill, Inventor
By Atty's
Earle Seymour

UNITED STATES PATENT OFFICE.

EBENEZER HILL, OF SOUTH NORWALK, CONNECTICUT.

CUT-OFF VALVE FOR STEAM-ENGINES.

SPECIFICATION forming part of Letters Patent No. 457,558, dated August 11, 1891.

Application filed January 5, 1891. Serial No. 376,731. (No model.)

*To all whom it may concern:*

Be it known that I, EBENEZER HILL, of South Norwalk, in the county of Fairfield and State of Connecticut, have invented new Improvements in Cut-Off Valves for Steam-Engines; and I do hereby declare the following, when taken in connection with accompanying drawings and the letters of reference marked thereon, to be a full, clear, and exact description of the same, and which said drawings constitute part of this specification, and represent, in—

Figure 1:
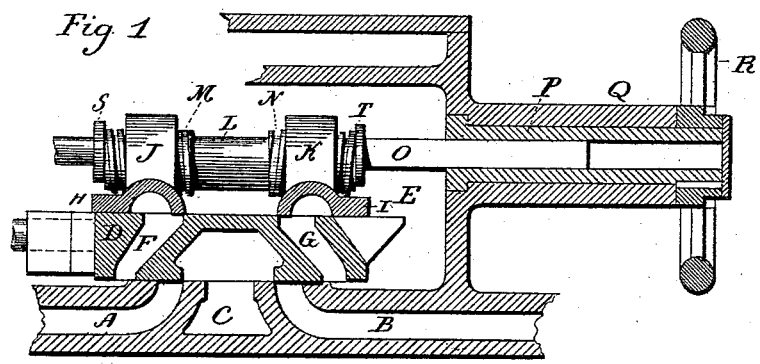
Figure 2:
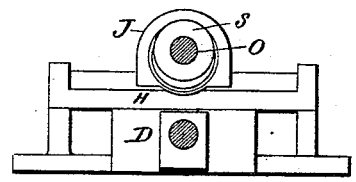
Figure 3:
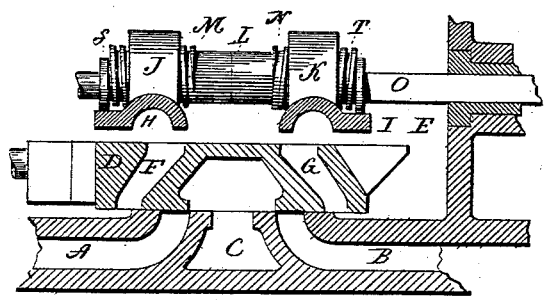
Figure 4:
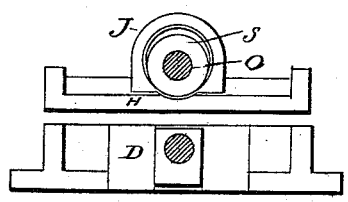
Figure 6:
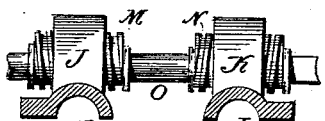
Figure 5:
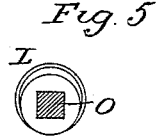

Figure 1, a vertical section through the steam-chest, a portion of the cylinder, and the valves, with the cut-off valves in the operating position; Fig. 2, an end view of the cut-off and main valve, looking from the left of Fig. 1; Fig. 3, the same as Fig. 1, showing the cut-off valves as raised from their seats; Fig. 4, the same as Fig. 2, showing the cut-off valve as raised from its seat; Fig. 5, an end view of the screw-threaded connection between the two valves, showing the rod O in transverse section; Fig. 6, a modification.

This invention relates to an improvement in means for operating or adjusting the sliding cut-off valves of steam-engines.

In steam-engines in which an independent cut-off valve is employed it is frequently desirable to dispense with the operation of the cut-off valve—for example, in marine engines it is often required to instantly back or run slowly. At such times the engine is handled much easier without the cut-off, and it is also often desirable in this class of engines to adjust the cut-off valves with relation to each other and to their respective ports.

The object of my invention is a simple mechanical device whereby the valves may be removed from their seats, so as to render the cut-off valve inoperative and permit the steam to pass directly to the main valve, and also to adapt the same mechanism to the adjustment of the valves with relation to each other and their respective ports; and the invention consists in the construction, as hereinafter described, and particularly recited in the claims.

A represents one of the steam-passages of the cylinder, and B the other steam-passage, C representing the exhaust-passage.

D represents the main valve, which is arranged in a steam-chest E in a common and well-known manner, and it is constructed with passages F G, adapted to operate in connection, respectively, with the steam-passages A B for the admission and exhaust of steam—a common and well-known construction of valve.

H represents the cut-off valve for the passage F, and I represents the cut-off valve for the passage G of the main valve. These valves are arranged to slide upon the back of the main valve D, and so as to cut off the steam from the said passages at the desirable point in the stroke of the piston. The valves are made independent of each other. The valve H is constructed with a projection upon its back, forming a nut J, and the valve I is constructed with a like projection upon its back, forming a nut K, the axes of these nuts being in line with each other and parallel with the path of movement of said valves.

L represents the connection between the two valves, which unites them so that they may operate as one structure. This connection L is constructed with a left-hand thread M at one end and a corresponding right-hand thread N at the other end, the screw-threaded portions extending through the respective nuts J K, those nuts being threaded corresponding to the thread of the said connection. Hence if the said connection be rotated in one direction it will draw the valves toward each other, or if rotated in the opposite direction it will force the valves away from each other, and in either case correspondingly change the time of cut-off by the valves. The right and left hand screw-threads being of the same pitch, a like movement will be produced upon each valve. It is not, however, essential that the threads of both screws be of the same pitch—in fact, it may be desirable in some cases to make them with different pitches for the purpose of making a variation in the valve cut-off to compensate for the variation in the movement of the piston caused by the angularity of the connecting-rod. To rotate this connection L, it is made tubular, the opening through it being of angular shape, as represented in Fig. 5, and preferably eccentric to the screw-thread, as also represented in Fig. 5, for reasons which will be hereinafter described.

Through the tubular connection L the correspondingly angular-shaped valve-rod O extends into a rotatable sleeve P, arranged at one end of the steam-chest within a head Q, the said sleeve being held against longitudinal movement, but free for rotation and adapted to be rotated by means of a hand-wheel R on its outer end. The rod is free for longitudinal movement in the sleeve in the usual operation of the valve; but the rod is connected to the sleeve so as to rotate therewith. This is best done by continuing the angular shape of the rod into the sleeve, the sleeve being made of corresponding shape. By this construction it will be evident that if the sleeve P be rotated it will impart a corresponding rotation to the rod O, and also to the connection L between the two valves, and such rotation of the connection L will, because of the right and left hand screw-threads, impart to the respective valves a corresponding movement, separating the valves, or causing them to approach each other, according to the direction in which the valve-rod is turned. The valve connection L is coupled with the valve-rod so as to travel with it in any suitable manner, here represented as by a collar S, fixed on the rod at one end of the connection L, and a like collar T, fixed to the rod at the other end of the connection L.

The adjustment of the valves, as I have described, may readily be made while the engine is running, so that the point of cut-off may at any time be varied by the engineer without stopping his engine or disarranging any of its parts.

In order that the cut-off valves may be conveniently thrown out of operation when not required for use, the opening through the connection L is made eccentric, as seen in Figs. 1 and 5. Consequently the rotation of the connection will be upon the axis of the valve-rod, but eccentric to its own axis. As seen in Figs. 1 and 2, the cut-off valves are resting upon their seats, and as in operation they will simply slide backward and forward, performing their duty in cutting off the steam in connection with the main valve, now if the connection L be rotated, say, one half-revolution the eccentricity of the connection will cause the valves to rise from their seats, as seen in Figs. 3 and 4, thus removing the cut-off entirely and permitting the main valve to operate the same as if no cut-off valves were employed. This removal of the cut-off valves from their seats is produced by the rotation of the hand-wheel Q through the rotatable sleeve O. When it is desired to re-employ the cut-off valves, and if no change in their relative position is desired, the connection is returned from the position seen in Fig. 4 to that seen in Figs. 1 and 2, bringing the cut-off valves back onto their seat in the same position as when they were removed therefrom. Thus the cut-off valves are under the ready control of the engineer, to be dispensed with or employed as occasion may require.

If in the removal of the valves from their seats it is desired to change their position, the rotation of the rod is made accordingly. The half-rotation in either direction will raise the valves from their seat, to be returned by a return of the rotation or by a completion of the revolution. In the completion of the revolution the screw-threads will have changed the positions of the valves to each other and to their ports accordingly. The fact that in the adjustment of the valves with relation to each other they may be raised from their seats for an instant is no practical objection, but with the eccentric arrangement of the connection upon the valve-rod it is necessary in adjusting the valves with relation to each other to make full revolutions of the connection in order to bring the valves back to their seats; but without such eccentricity, then a more minute adjustment may be produced by giving fractional revolutions to the connection. It is not necessary that the two screw-threads should be positively connected to unite the valves, as the threads may be separate from each other, but joined by the rod which passes through them, as seen in Fig. 6, each part being held upon the rod against independent longitudinal movement. I, however, for obvious reasons, prefer the first-mentioned construction. The screw-threads may be omitted, so that there will be no longitudinal adjustment, and attain all the advantages of removing the valves from the seats or returning them thereto, as occasion may require. It is not necessary that the connection L between the valves should be made in a single piece—as, for illustration, it may be made in two parts, the division being as represented in broken lines, Fig. 3, the two parts abutting together, so as to make a practical connection between the two valves.

I make no claim in this application to the particular construction of the sleeve P, here represented as operated by the hand-wheel R, as this particular construction is the invention of another and the subject of an independent application.

I claim—

1. A sliding cut-off valve for steam-engines, combined with an ecccentric, the axis of said eccentric being parallel with the path of movement of the said valve and arranged in a projection from the said valve, movable with the valve, and mechanism substantially such as described for imparting rotation to said eccentric, whereby the valve may be raised from or returned to its seat, substantially as specified.

2. In a steam-engine, a sliding cut-off valve composed of two parts independent of each other, each part constructed with a nut, the axes of which are in line with each other and with the path of movement of the said valve, the said nuts oppositely screw-threaded, a connection between said two valves, correspondingly screw-threaded, the said correspondingly-threaded portions extending into the respective nuts, and mechanism substantially such as described for imparting rotation to said connection, substantially as and for the purpose specified.

3. In a steam-engine, a sliding cut-off valve made in two parts independent of each other, each part constructed with a nut, the axis of which is parallel with the path of movement of the said valve, the said nuts oppositely screw-threaded, a connection between the said two valves constructed with screw-threads corresponding to the threads of the said nuts and extending into said nuts, the said connection tubular, the opening through the said connection being of angular shape and eccentric to the axis of the said screw-threads, and mechanism substantially such as described for imparting rotation to said rod, substantially as and for the purpose specified.

In testimony whereof I have signed this specification in the presence of two subscribing witnesses.

EBENEZER HILL.

Witnesses:
JACOB M. LAYTON,
HENRY W. BODWELL.